May 27, 1947.  W. M. JOHNSON  2,421,299
TRANSFORMER CONNECTION
Filed Dec. 4, 1944  2 Sheets-Sheet 1
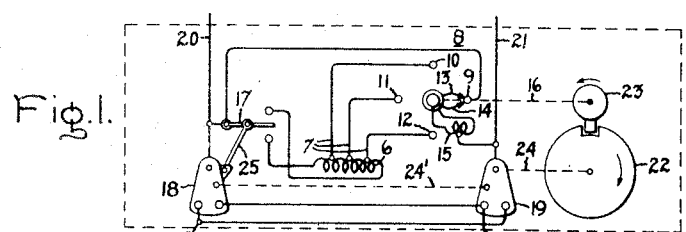
Fig.1.
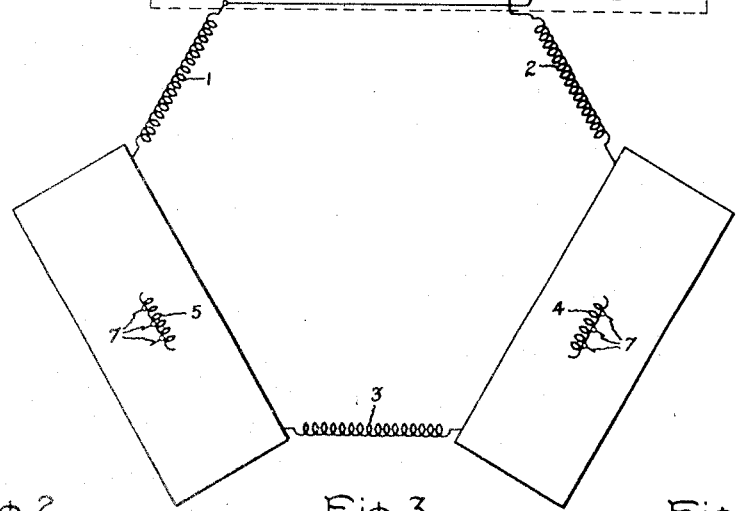
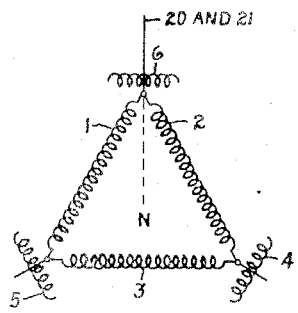
Fig.2.
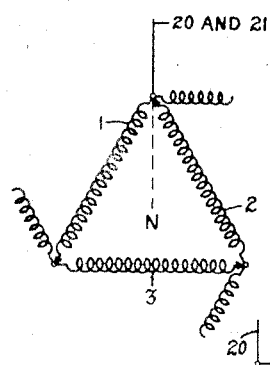
Fig.3.
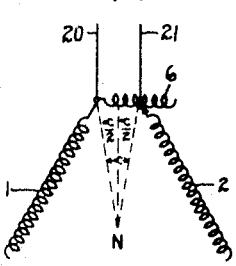
Fig.4.
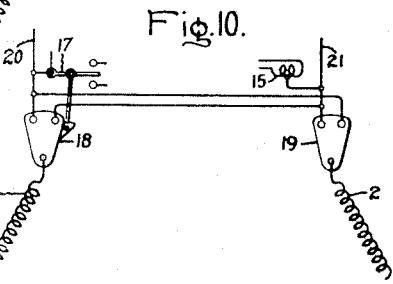
Fig.10.
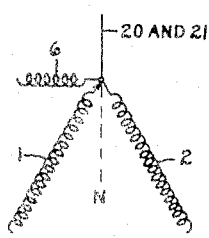
Fig.5.
Inventor:
Wallace M. Johnson,
by Harry E. Dunham
His Attorney.

May 27, 1947. W. M. JOHNSON 2,421,299
TRANSFORMER CONNECTION
Filed Dec. 4, 1944 2 Sheets—Sheet 2
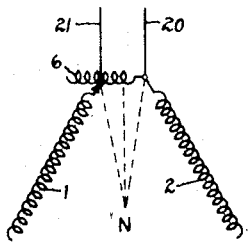
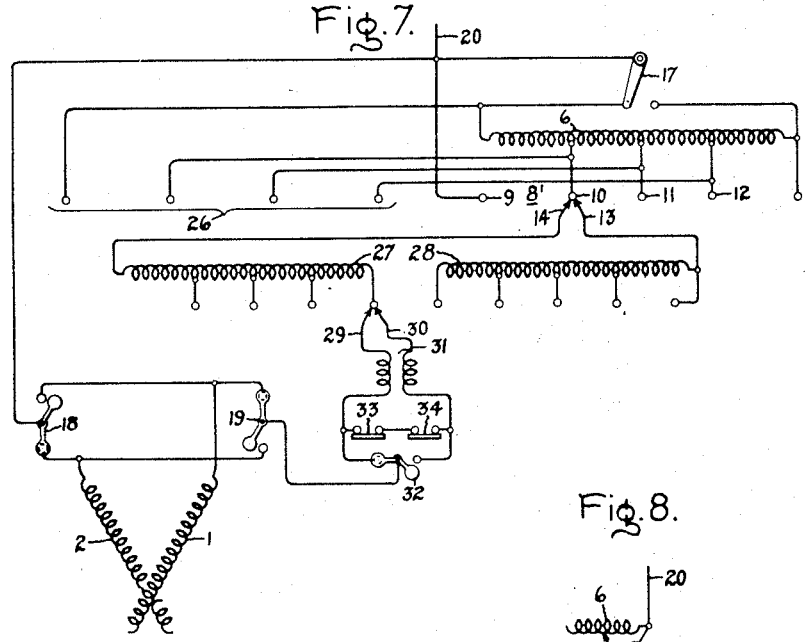
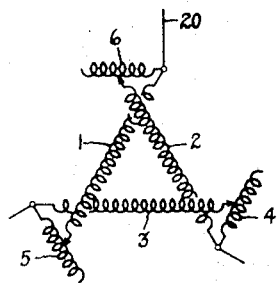
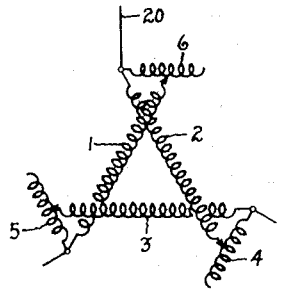
Inventor:
Wallace M. Johnson,
by Harry E. Dunham
His Attorney.

Patented May 27, 1947

2,421,299

UNITED STATES PATENT OFFICE 2,421,299

TRANSFORMER CONNECTION

Wallace M. Johnson, Pittsfield, Mass., assignor to General Electric Company, a corporation of New York Application December 4, 1944, Serial No. 566,562

15 Claims. (Cl. 171—119)

1

This invention relates to transformer connections and more particularly to improvements in phase shifting transformers.

An economical way of shifting the phase of the voltage in polyphase alternating-current power systems is to use a mesh connection of windings and vary the number of turns in one set of these, windings relative to the turns in the remaining set of windings. For example, in the case of a conventional three-phase circuit the mesh connection is made up of two sets of three-phase windings so interconnected that their vector voltages form a hexagon. In such a connection the windings of the two sets are alternated around the mesh so that if the effective turns of one set are reduced to zero the mesh becomes a delta instead of a hexagon. By reversing the polarity of one set of windings the connection becomes a so-called inverted hexagon and in either case the variation in the number of effective turns or the variation in the effective voltage of one set of windings causes a phase shift of the voltages to neutral of the corners of the mesh connection.

The mesh connection may either be an autotransformer or it may be the primary winding or the secondary winding of a conventional two-winding transformer. In all of these cases the six windings will normally be wound on a three-legged core so that there are two phase windings on each leg. However, the two phase windings can be wound on separate cores of single-phase transformers which may then be interconnected so as to constitute either an autotransformer system or a two-winding transformer system, depending upon whether or not there are additional primary or secondary windings on the cores of the single-phase transformers.

Assuming that the phase shift is zero when one set of windings is cut out so that, for example, in the three-phase case the mesh becomes a delta, then increasing the effective turns of the variable set of windings with one polarity will cause an advance in phase of the voltage of one corner of the mesh relative to neutral, while increasing the effective turns of the variable set of windings with the opposite polarity will cause a retardation in phase of that same corner of the mesh with respect to neutral. However, whenever the mesh connection constitutes the exciting winding of the transformer or transformer system, then such changes in the effective turns of one set of windings will cause operation of the transformer core or cores at varying maximum flux density which is an inefficient practice.

2

Furthermore, if constant output voltage is required, then in the case of a two-winding transformer or transformer system separate means must be provided for compensating for the change in voltage magnitude produced by the change in core flux. Similarly, if the mesh connection is the secondary winding of a two-winding transformer or transformer system, then the output voltage will also vary as a result of the phase shifting operation and consequently additional means, such as compensating taps on the primary winding, must be provided if constant output voltage is to be obtained. Examples of prior art systems which embody the above described general features are Garin Patent 2,292,829 and St. Palley Patent 2,330,088, both of which are assigned to the present assignee.

The principal way of changing the effective turns of a winding in a power circuit is by means of load-ratio-control switching equipment which changes tap connections to the winding without interrupting the load current through it. A standard form of load-ratio-control mechanism includes means for reversing the polarity of the tapped winding when the mechanism goes from one end of its range of operation to the other end of its range of operation. In other words, the mechanism includes a driven member which is usually rotatable, as by a driving motor, and which is turned continuously in the same direction when going from one end of its range to the other end of its range, the mid-point of the range being a neutral condition in which the effective turns of the tapped winding are all cut out. In this manner the voltage goes from a maximum of one polarity through zero to a maximum of the opposite polarity when the mechanism is going from one end of its range to the other. This arrangement is economical because the same winding in effect operates twice, once with one polarity and once with the opposite polarity throughout the complete range of operation of the ratio adjusting mechanism. In some forms of load-ratio-control mechanism of this type the same tap contacts are used twice and the tap-changing switch makes substantially two revolutions or traverses the path of the tap contacts twice in going from one end of its range to the other, whereas in other forms of this mechanism there are two sets of tap contacts for each transformer tap and the tap-changing switch only makes one revolution or traverses the tap contact path only once when the mechanism goes from one end of its range to the other.

An objection to using a standard load-ratiocontrol mechanism of the above-described type for obtaining positive and negative phase shifts with a mesh-connected transformer system is that the reversal of the polarity of the tapped winding will invert the mesh connection so that, for example, in the case of a hexagon it will go from a conventional hexagon to an inverted hexagon when passing through the neutral or phase shift position. Thus, if the positive and negative phase shifts are to be equal, then there is a greater change in output voltage magnitude or core flux when going from the neutral to the maximum phase shift in one direction than in going from the neutral or zero phase shift position to the maximum phase shift in the opposite direction due to the change in operation from a conventional hexagon to an inverted hexagon.

In accordance with this invention there is provided a novel system in which the mesh is not inverted when passing through the neutral or zero phase shift position and in which the tap-changing mechanism is operated in the same direction when going from one extreme end of its range to the other. Furthermore, the tap-changing mechanism or load-ratio-control system may be of the type in which the polarity of the tapped winding is reversed at the mid-point of its range of operation. This result is accomplished by means of transfer switches which provide the double function of transferring the line terminals from corner to corner of the mesh when the tap-changing system is passing through its neutral position and at the same time reversing the connections of the tapped set of windings in the mesh so as to compensate for the reversal of the polarity of the tapped winding. These additional transfer switches are characterized by transferring the line terminal connections within the mesh so that the phase current of the mesh rather than the line current is switched, thus providing minimum switching duty on the transfer switches.

An object of the invention is to provide a new and improved transformer system.

A further object of the invention is to provide a new and improved voltage phase shifting system.

An additional object of the invention is to provide an improved load-ratio-control type voltage phase shifting transformer system which is characterized by the use of standard load-ratio-control mechanism for giving equal relatively wide range positive and negative phase shifts with minimum variations in voltage magnitude or core flux or both.

The invention will be better understood from the following description taken in connection with the accompanying drawing and its scope will be pointed out in the appended claims.

In the drawing Fig. 1 illustrates diagrammatically an embodiment of the invention, Figs. 2, 3, 4, 5 and 6 are simplified diagrams for illustrating the operation of Fig. 1, Fig. 7 illustrates diagrammatically a modification of the invention, Figs. 8 and 9 are simplified diagrams for illustrating the operation of Fig. 7, and Fig. 10 is a modification of Fig. 1.

Referring now to the drawing and more particularly to Fig. 1, there is shown therein three windings 1, 2 and 3 which constitute one set of three-phase transformer windings in that it is to be understood that these windings are on separate core legs whose fluxes are displaced 120 electrical degrees in phase. These core legs may either be parts of a unitary three-legged core for a three-phase transformer or they may be the winding legs of separate single-phase transformers which are interconnected for three-phase operation. Three additional windings 4, 5 and 6 constitute a second set of three-phase transformer windings, winding 4 being on the same core leg as winding 1, winding 5 being on the same core leg with winding 2, and winding 6 being on the same core leg with winding 3 so that the voltages of the windings which are on the same leg are in phase with each other. For facilitating an understanding of the invention the windings are shown in Fig. 1 with their axes parallel to their vector voltages and it will be seen that the axes of windings 1, 2 and 3 are displaced 120 degrees from each other and the axes of the windings 4, 5 and 6 are parallel respectively with the windings of the first set.

For obtaining voltage phase shift control the windings 4, 5 and 6 are provided with taps 7 and with suitable load-ratio-control switching mechanism 8. The details of the switching and control mechanism for winding 6 only are shown in Fig. 1 and it will be understood that windings 4 and 5 are provided with identical apparatus so that the circuit is symmetrical. The load-ratio-control switching mechanism is shown by way of example as comprising a dial switch having four fixed contacts 9, 10, 11 and 12 arranged on the circumference of a circle. These contacts are selectively engaged by a pair of ratio adjuster contact fingers 13 and 14 which are connected respectively to the terminals of a reactor 15 whose electrical mid-point is effectively one of the circuit terminals of the winding 6.

The ratio adjuster fingers 13 and 14 are driven by any suitable mechanism which is shown schematically by way of example as an operating shaft 16. In practice one ratio adjuster finger is first transferred from one fixed contact to the next fixed contact and this is followed up by a similar movement of the other ratio adjuster finger so that the circuit through the winding 6 is never broken.

For substantially doubling the number of voltage steps obtainable with the number of taps which are provided in the winding 7 a reversing switch 17 is provided. This has a pair of stationary contacts connected respectively to the terminals of the winding 6 and has a common movable contact which is effectively the other circuit terminal of the winding 6.

For controlling the external connections to the transformer windings and for compensating for the effect of the reversing switch 17 a pair of transfer switches 18 and 19 are provided. Each of these transfer switches is in effect a single-pole double-throw switch and the movable contact or switch blade is wide enough to bridge the two fixed contacts in its intermediate position. As shown, the two fixed contacts of switch 18 are connected respectively to a terminal of windings 1 and 2 and the two fixed contacts of switch 19 are connected respectively to the same terminals of windings 1 and 2. The mid-point of the reactor 15 is connected to the movable contact of switch 19 and the movable contact of the reversing switch 17 is connected to the movable contact of the switch 18 so that the winding 6 is inserted between the windings 1 and 2.

A pair of external line conductors 20 and 21 are also connected respectively to the movable contacts of the switches 18 and 19. The reversing switch 17 and the transfer switches 18 and 19 are interlocked mechanically with the driving mechanism for the ratio adjuster switch 8. As shown diagrammatically, this may consist of a Geneva gear 22 which is driven by a Geneva gear driver 23 positioned on the shaft 16. The Geneva gear 22 drives the switches 18 and 19 through shaft 24 and link 24' and the reversing switch 17 is driven by movement of the switch 18 through a link 25. The duplicate load-ratio-control mechanisms and transfer switches for the windings 4 and 5 (not shown) are preferably driven synchronously with the corresponding mechanism for the winding 6 so that all the ratio adjusters, reversing switches and transfer switches are always in corresponding positions at all times.

The operation of Fig. 1 is as follows: The load-ratio-control mechanism for the winding 6 is shown in its neutral position in that ratio adjuster fingers 13 and 14 both make contact with fixed contact 9 which is the neutral contact as it is connected directly to the movable contact of the reversing switch 17. It will be observed that in this neutral position of the load-ratio-control mechanism the reversing switch 17 is open and the transfer switches 18 and 19 are in their bridging positions so that the windings 4, 5 and 6 are open circuited and the windings 1, 2 and 3 are directly interconnected to form a delta connection. This neutral condition of the circuit of Fig. 1 is shown in Fig. 2 in which the windings 1, 2 and 3 are shown as forming a closed delta and the windings 4, 5 and 6 are shown floating. Of course, in an actual system the latter windings would not be allowed to float in this manner and they would be tied to ground or some other suitable reference point by any suitable means, such as a high resistance connection, so as to prevent them from attaining objectionable voltage.

It will be observed that the line conductors 20 and 21 are both connected to the junction of the windings 1 and 2 so that there is no voltage phase difference between these line conductors and, furthermore, the phase of their common voltage corresponds to the voltage to neutral of this junction.

Assume now that the shaft 16 is turned counterclockwise. This starts the ratio adjuster fingers moving successively around the path of the fixed contacts in a counterclockwise direction. It also causes the Geneva gear 22 to be moved through a given angle in a clockwise direction so as to cause the movable contacts of the transfer switches 18 and 19 to move clockwise and so as to cause the movable contact of the reversing switch 17 to move clockwise. The operation of the reversing switch 17 causes the left-hand end of the winding 6 to be connected to the movable contact of the transfer switch 18. The operation of the transfer switch 18 causes its movable contact to break connection with the winding 2 so that this switch now directly interconnects line terminal 20 and the left-hand end of the winding 6 with the winding 1 but not with winding 2. Similarly, the operation of the transfer switch 19 breaks the connection between line terminal 21, and the mid-point of the reactor 15, with the winding 1 so that this line conductor 21 and the mid-point of the reactor are now directly connected to the winding 2. However, until the ratio adjuster contact finger 13 makes contact with the fixed contact 10 the windings 1 and 2 and the line conductors 20 and 21 are still directly interconnected through the permanent connection between the neutral contact 9 and the movable contact of the reversing switch 17. This condition of the circuit is shown in Fig. 3 in which the arrow at the end of the winding 2 indicates that the ratio adjuster switch 8 is connected directly to this point. As the shaft 16 continues to rotate in the counterclockwise direction the effective voltage or effective turns of the winding 6 are increased progressively so that the connection is transformed from a delta to a hexagon in that a progressively increasing amount of the voltage of winding 6 is inserted between windings 1 and 2 and it will of course be understood that in a like manner progressively increasing portions of the voltage of winding 4 are inserted between windings 2 and 3 and progressively increasing portions of the voltage of winding 5 are inserted between windings 3 and 4.

This condition of the system is illustrated in Fig. 4 and it will be observed that the line conductors 20 and 21 are now separated by the effective voltage of the winding 6 and that there is a phase angle difference between the voltages of these line conductors represented by the angle α. It will also be noted that the phase of the voltages of the line conductors 20 and 21 has been shifted equally but in opposite directions from the position shown in Figs. 2 and 3, the angle being $\alpha/2$ in each case.

If the ratio adjuster mechanism had been turned in the opposite direction from the position illustrated in Fig. 1, then the reverse action would take place in that the reversing switch 17 would connect the right-hand terminal of the winding 6 to the movable contact of the switch 18 but the reverse motion of the switch 18 would connect this right-hand terminal of winding 6 to winding 2 and, similarly, the reverse action of transfer switch 19 would connect the mid-point of the reactor 15 to the winding 1. Furthermore, the connections of the line conductors 21 and 22 would be transposed. However, before ratio adjuster contact finger 14 engages fixed contact 12 the permanent connection between fixed contact 9 and the movable contact of the reversing switch 17 will directly interconnect the line conductors 20 and 21 and also the terminals of the windings 1 and 2 so that the circuit will be in the condition shown in Fig. 5. The arrow in this figure indicates that the winding 1 is now directly connected to the movable contacts of ratio adjusting switch 8 through the transfer switch 19. As the ratio adjuster fingers rotate step by step clockwise the voltage of winding 6 is progressively increased, as indicated in Fig. 6, and it will be observed that the hexagon is not inverted but has the same form that it has in Fig. 4, although the polarity of the voltage of winding 6 has been reversed by the reversing switch 17. However, due to the transposition of the line conductors 20 and 21 the phase shift angle has now been reversed so as to become negative instead of positive and this is true both with respect to the phase angle between the voltages of these line conductors and also with respect to the phase angle of the voltages of each line conductor relative to their phase positions in the neutral condition of the system, namely, when the windings 4, 5 and 6 are cut out and the mesh is a delta.

The circuit of Fig. 1 can be used as an autotransformer connection, in which case line conductor 20 can be either the input (exciting) side or the output (load) side and the line conductor 21 will then be the opposite side of the transformer. Also, the circuit of Fig. 1 can be used as either the secondary winding or the primary winding of a transformer or transformer system, in which case line conductor 20 or line conductor 21 may be dispensed with. However, in all cases, the relative phase of the voltages of all of the windings stays the same in all positions of the tap-changing mechanism. Of course, in the case where the windings illustrated in Fig. 1 constitute a mesh-connected secondary winding of a two winding transformer, the phase of the voltages of the windings is fixed by the excitation of the transformer which can either be a simple three-phase wye or delta winding. Such a winding may, however, be provided with compensating taps for keeping the output voltage magnitude constant when the ratio adjuster mechanism is operated so as to shift the phase of the secondary voltage.

The reversing switch 17 operates when the ratio adjuster fingers 13 and 14 are on the neutral contact 9 and winding 6 is not part of a closed circuit so that there is substantially no switching duty whatever on the reversing switch 17. Transfer switches 18 and 19 also operate at this time and their fixed contacts are each in effect short circuited through the reactor 15 and the ratio adjuster fingers 13 and 14, neutral contact 9 and the terminal of the movable contact of the reversing switch 17. Hence, the current duty on these transfer switches is the full mesh current but the only voltage duty is that due to the reactance drop in the reactor 15 and the leads of the above-mentioned circuit. As the transfer switches operate within the mesh, that is to say, as they control the connections between the phase windings in the mesh, they do not have to handle the line current but only handle the phase or mesh current which is substantially less than the line current. It will also be observed that in Fig. 1 the ratio adjuster switch 8, that is to say, its contact fingers 13 and 14 make practically two revolutions (one revolution minus one tap in each direction) in traversing the entire control range of the system and that it traverses this entire range while being operated continuously in the same direction. For example, both ratio adjuster fingers 13 and 14 will be on the fixed contact 12 when the system is in its position for giving maximum phase angle advance or the maximum positive phase angle and then by rotating the shaft 16 clockwise the switch will make substantially one revolution before it reaches its neutral point when its contact fingers are in engagement with the neutral contact 9. At this point the reversing switch 17 and the transfer switches 18 operate and the ratio adjuster fingers then continue on in a clockwise direction and produce progressively larger amounts of phase angle retard or negative phase shift until the contact fingers engage contact 10 again which is their limit in the negative direction.

Referring now to Fig. 7, a different form of ratio adjuster mechanism 8' is provided in which approximately twice as many tap contacts are provided as there are taps in the winding 6. Tap contact 9 is the neutral tap, as in Fig. 1, and tap contacts 10, 11, and 12, correspond to the taps which are used for positive phase shift. However, a duplicate set of contacts 26 is provided for giving negative phase shift angles, these being connected to the transformer taps, as shown. These tap contacts are all shown arranged in a straight line and they may actually be arranged in this manner or they may be arranged in a circle, as in Fig. 1. However, with this arrangement of tap contacts, when they are arranged in a circle, the ratio adjuster fingers will only go around once when traversing the entire phase shift range. The ratio adjuster fingers 13 and 14 instead of being connected through a mid-tapped reactor to the movable contact of the transfer switch 19, as in Fig. 1, are connected thereto through two additional arrangements. The first is a vernier ratio adjuster comprising a pair of insulated or separated windings 27 and 28. The voltages of the windings 27 and 28 are preferably in phase with the voltage of the winding 6, although this is not necessary and they are preferably wound on the same core leg with the winding 6. The windings 27 and 28 are each provided with a plurality of taps, the voltage differences between which are small in comparison with the voltage differences between the taps of the main winding 6 and these taps are connected to vernier ratio adjuster contacts which are engaged selectively by vernier ratio adjuster fingers 29 and 30 which operate step by step in the same manner as the main ratio adjuster fingers 13 and 14. In this manner a plurality of intermediate phase shift angles are obtained in the operation of the system and the operation is such that ratio adjuster 13 only moves from tap contact to tap contact of the main ratio adjuster when vernier ratio adjusters 29 and 30 make contact with vernier winding 27 and, similarly, main ratio adjuster finger 14 is only moved from main tap contact to main tap contact when the vernier ratio adjuster fingers are connected to vernier winding 28. In this manner the switching duty on the main ratio adjuster fingers is reduced substantially to zero. This vernier ratio adjuster scheme per se is not a part of this invention and it is disclosed and claimed in Patent 2,200,979, granted May 14, 1940 on an application of Louis F. Blume, and assigned to the assignee of this invention.

The vernier ratio adjuster contact fingers are connected to the terminals of a split reactor 31 whose opposite terminals are connected to the fixed contacts of a non-arcing duty selector switch 32 whose common contact is connected to the movable contact of the transfer switch 19. Bridged between the lower terminals of the split reactor, or in other words, between the fixed contacts of the selector switch 32 are two serially-connected sets of arcing duty contacts 33 and 34 which are operated substantially simultaneously. The selector switch 32 and the arcing duty contacts cooperate in such a manner that the current switched is all handled by the arcing duty contacts, and the selector switch 32 merely transfers the connections from one ratio adjuster finger to the other when the arcing duty contacts are closed, the current of the unswitched vernier ratio adjuster finger thus flowing through the arcing duty contacts until they are open. This type of load ratio control per se is also no part of this invention and it is described and broadly claimed in Patent 2,112,064, granted March 22, 1938, on an application of Louis F. Blume, and a preferred form of the system is described and claimed in Patent 2,246,182, granted June 17, 1941, on an application of Arthur Palme et al. Both of these patents are assigned to the assignee of this invention.

It will of course be understood that windings 4 and 5 of the mesh connection are provided with similar load-ratio-control mechanism to that shown for winding 6.

The relative polarities of the windings have been so arranged in Fig. 7 that the circuit operates as an inverted hexagon. This can be done in many ways, such, for example, as by reversing the connections between the terminals of the winding 6 and the fixed contacts of the reversing switch or by reversing the connections or direction of operation of the transfer switches, etc.

The operation of Fig. 7 is illustrated in Figs. 8 and 9, Fig. 8 showing the inverted hexagon operating to give positive voltage phase shift of the line conductor 20, in which case the line conductor 20 is connected directly to the winding 1 and the terminal of the winding 2 is connected to the ratio adjuster mechanism for the winding 6, whereas in Fig. 9 the transfer switches are operated to transfer the line terminal 20 to the winding 2 and to transfer the ratio adjuster connection to the winding 1, these transfers taking place at the neutral point where the windings 4, 5 and 6 are cut out and the windings 1, 2 and 3 are interconnected to form a delta connection, as in Fig. 2.

For autotransformer operation of Fig. 7, the line conductor 21 of Fig. 1 can be connected to the common contact of transfer switch 19, as in Fig. 1.

As shown in Fig. 10 the arrangement of the transfer switches 18 and 19 can be reversed if desired.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, two sets of three-phase transformer windings connected in a closed mesh whose vector voltages constitute a hexagon, tap-changing means for one of said sets of windings, said tap-changing means having an operating member which when rotated in the same direction causes the effective voltage of said one set of windings to vary from a maximum in one direction through zero to a maximum in the other direction, means for reversing the connections of said one set when its tap-changing means goes through its zero effective voltage position, and line terminals for said mesh connected to said connection reversing means.

2. The method of shifting the phase of the terminal-to-neutral voltages of a mesh connection of windings whose vector voltages normally form a hexagon which comprises reducing the effective turns of one alternate sets of windings in said mesh to zero so as to convert said vector hexagon to a delta, transferring said terminals from one end of the windings of said alternate set to the other end while keeping said terminals connected to the corners of said delta, reversing the terminal connections of the windings of said alternate set with respect to the other windings of said mesh connection, and increasing the effective turns of the windings of said alternate set with reversed polarity voltage.

3. In combination, a polyphase mesh connection of windings, means for varying the effective voltage of certain of said windings from a maximum of one polarity through zero to a maximum of the opposite polarity, and transfer means for changing the external circuit connections of said mesh connection from point to point in said mesh connection and reversing the connections of said certain windings in said mesh.

4. In combination, a polyphase mesh connection of windings, means for varying the effective turns of certain of said windings, and transfer means for changing the external circuit connections of said mesh connection from point to point in said mesh connection and reversing the connections of said certain windings in said mesh, said transfer means being connected so as to handle only the phase current of said mesh connection and not its line current.

5. A polyphase system comprising, in combination, two sets of corresponding phase windings, the phase windings of said sets being alternated in a closed mesh connection, means for changing the effective turns of one set between zero and a maximum, means for reversing the voltage polarity of said one set when its effective turns are zero, line terminals for said mesh connection, and means operative when the effective turns of said one set are zero and when said reversing means operates for shifting said line terminals so that they will correspond with different corners of said mesh when the effective turns of said one set are changed to other than zero, said last-mentioned means handling the phase current of said mesh connection as contrasted with its line current and being effective to reverse the terminal connections of said one set of windings.

6. A polyphase system comprising, in combination, two sets of corresponding phase windings, the phase windings of said sets being alternated in a closed mesh connection, means for changing the effective turns of one set between zero and a maximum, means for reversing the voltage polarity of said one set when its effective turns are zero, line terminals for said mesh connection, and transfer means operative when the effective turns of said one set are zero and when said reversing means operates for shifting said line terminals so that they will correspond with different corners of said mesh when the effective turns of said one set are changed to other than zero, said transfer means also being effective to reverse the terminal connections of said one set of windings when its polarity is reversed.

7. In combination, a mesh connection of phase windings, at least one of said windings being divided into a plurality of equal sections by a plurality of intermediate taps, a tap-changing switch having as many contacts as said winding has sections, said contacts being equally spaced around a circle, said taps being connected respectively to said contacts in progressive order, there being one more contact than there are taps, a line terminal connected to the remaining contact, switching means for selectively connecting said line terminal to either end of said winding, other switching means for selectively connecting said line terminal to terminals of the other windings of said mesh connection, tap-changing means for selectively engaging said contacts, and additional switching means for selectively connecting said tap-changing means to said terminals of said other windings.

8. In combination, a polyphase mesh connection of transformer windings, switching means for reversing the terminal connections of one of said windings in said mesh, and an external circuit conductor for said mesh connected to a point on said one winding, the connection between said external circuit conductor and said point being exclusive of said switching means.

9. In combination, a polyphase mesh connection of transformer windings, switching means for reversing the terminal connections of one of said windings in said mesh, an external circuit conductor for said mesh connected to a point on said one winding, the connection between said external circuit conductor and said point being exclusive of said switching means, and means for varying the effective voltage of said one winding.

10. In combination, a polyphase mesh connection of transformer windings, switching means for reversing the terminal connections of one of said windings in said mesh, an external circuit conductor for said mesh connected to a point on said one winding, the connection between said external circuit conductor and said point being exclusive of said switching means, and means for reducing the effective voltage of said one winding to zero when its terminal connections are reversed.

11. In combination, a polyphase mesh connection of transformer windings, switching means for reversing the terminal connections of one of said windings in said mesh, and an external circuit conductor for said mesh connected to a point on said one winding, the connection between said external circuit conductor and said point being exclusive of said switching means whereby said switching means handles only the phase current of said mesh and not its line current, said switching means always keeping the terminals of said one winding connected to said mesh.

12. In combination, a polyphase mesh connection of transformer windings, switch means for reversing the terminal connections of one of said windings in said mesh, an external circuit conductor for said mesh permanently connected to a point on said one winding, the connection between said external circuit conductor and said point being exclusive of said switching means, and means for reversing the effective polarity of said one winding when said switching means reverses its terminal connections whereby the character of the polygon whose sides correspond to the vector voltages of said windings remains the same.

13. In combination, a polyphase mesh connection of transformer windings, an external circuit conductor for said mesh connection, and switching means having a plurality of sets of make and break contacts each of which carries only the phase current of said mesh and not the line current in said circuit conductor for selectively connecting said external circuit conductor to various points in said mesh connection.

14. In combination, a polyphase mesh connection of transformer windings, an external circuit conductor for said mesh connection, and switching means having a plurality of sets of make and break contacts each of which carries only the phase current of said mesh and not the line current in said circuit conductor for selectively connecting said external circuit conductor to various points in said mesh connection without opening said mesh connection.

15. In combination, a polyphase mesh connection of transformer windings, an external circuit conductor for said mesh connection, switching means having a plurality of sets of make and break contacts each of which carries only the phase current of said mesh and not the line current in said circuit conductor for selectively connecting said external circuit conductor to various points in said mesh connection, and means having a rotatable operating member for varying the effective voltage of one set of electrically alternate windings in said mesh connection from a maximum of one effective polarity through zero to the same maximum with opposite effective polarity when said operating member is rotated in the same direction from one extreme position to another extreme position.

WALLACE M. JOHNSON.

REFERENCES CITED

The following references are of record in the file of this patent:

UNITED STATES PATENTS

| Number | Name | Date |
|---|---|---|
| 2,330,088 | St. Palley | Sept. 21, 1943 |
| 2,292,829 | Garin | Aug. 11, 1942 |
| 2,291,340 | Lennox | July 28, 1942 |